Jan. 12, 1971 J. GREENBERG ET AL 3,554,806
HEAT ACTIVATED CELL WITH ALKALI ANODE
AND ALKALI SALT ELECTROLYTE
Filed Dec. 30, 1968

INVENTORS
JACOB GREENBERG
THOMAS E. SEITZ

BY

ATTORNEYS

United States Patent Office 3,554,806
Patented Jan. 12, 1971

3,554,806
HEAT ACTIVATED CELL WITH ALKALI ANODE AND ALKALI SALT ELECTROLYTE
Jacob Greenberg, Pepper Pike, and Thomas E. Seitz, Willoughby, Ohio, assignors to the United States of America as represented by the Administrator of the National Aeronautics and Space Administration
Filed Dec. 30, 1968, Ser. No. 787,906
Int. Cl. H01m 35/02
U.S. Cl. 136—6                  10 Claims

ABSTRACT OF THE DISCLOSURE

A heat activated cell having an anode made of one or more alkali metals and a cathode made of an oxidizing material which will react with the anode to form a stable salt. The anode and cathode are separated by an alkali salt electrolyte deposited in a thin layer on a divider made of a porous electrically conductive material. The salt is heated to a temperature sufficiently below its melting temperature that it does not disintegrate.

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

The invention relates to electromotiveforce (EMF) cells and is directed more particularly to a heat activated secondary cell or battery.

Alkali metals, because of their high reactivity and low weight, are desirable for use as anode materials in high-current, light-weight cells. Electrolytes suitable for use with alkali metal anodes include molten salts, inorganic solvents, or solid materials, such as ceramic.

When molten salt electrolytes are used in EMF cells, the operating temperature of the cells must be relatively high. This causes undesirable vaporization of the alkali metals. The inorganic solvent electrolytes and the solid electrolytes, on the other hand, all require the addition of suitable materials to obtain acceptable ion conduction levels. Nevertheless, conduction is still too low to satisfy high current density requirements without operating the cell at high temperatures.

Accordingly, it is an object of the invention to provide an improved heat-activated EMF cell of low weight and high current density capability.

It is another object of the invention to provide an EMF cell using a solid electrolyte which also serves as a separator between anode and cathode materials.

It is a further object of the invention to provide a heat-activated EMF cell using an alkali metal anode and which operates at relatively low temperature.

Other objects and advantages of the invention will become apparent from the following description and the accompanying single figure.

BRIEF DESCRIPTION OF THE DRAWING

The single figure is a cross-sectional view of an EMF cell constructed in accordance with the invention.

DESCRIPTION OF THE PREFERRED EMBODIMENT

Figure 1:
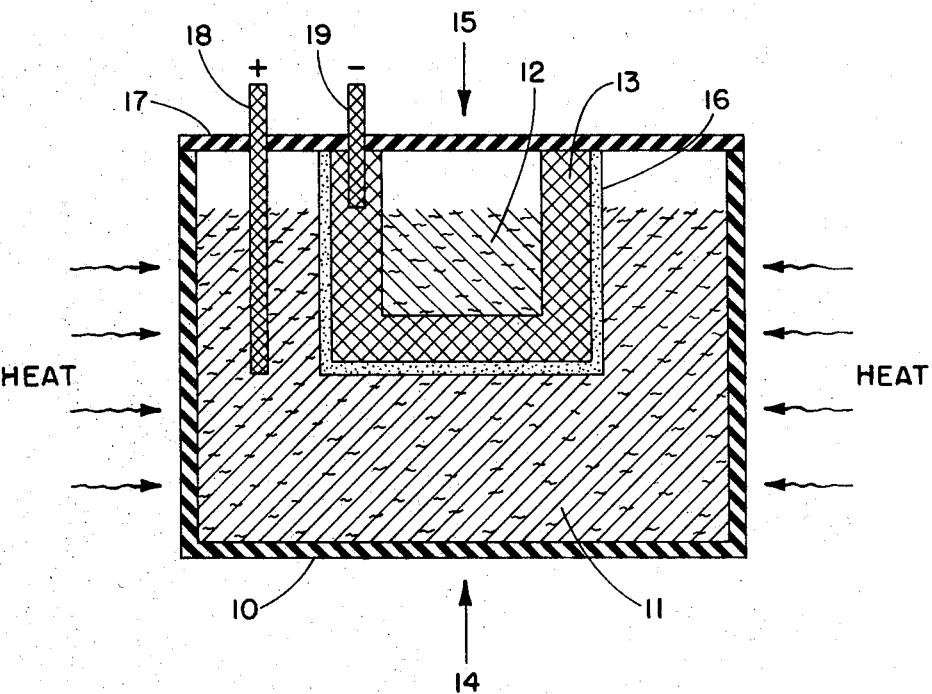

As shown in the single figure, an EMF cell constructed in accordance with the invention may include a suitable container 10. The container 10 may be made of an electrical insulating material such as ceramic or may even be a metal. However, if metal is used for the container, it will be understood that it must be a metal which will not react with other materials to be used in the cell.

In order to divide the cell into sections for containing an anode material 11 and a cathode material 12, respectively, a cup 13 made of a porous electrically conductive material is disposed in the container 10. The cup 13 forms a chamber 14 for the anode material 11 and a chamber 15 for the cathode material 12 and thus serves as a divider. Porous carbon, metal or ceramic may be used as material for the cup 13.

The anode material 11 may be either a single alkali metal or a mixture of any two or more of the alkali metals in any proportion. The alkali metals include lithium, sodium, potassium, rubidium, and cesium. These are all monovalent metals in the first group of the periodic system.

The cathode material 12 may be any oxidizing material which will react with the anode to form a stable salt. By way of example, the cathode material 12 may include one or more of the following: halogen gases, halogen compounds, nitrates, terrous compounds, cobaltous compounds, sulfur and selenium. In general, any of the well-known multivalent cathode materials can be used satisfactorily.

To provide a solid electrolyte which also serves as a separator between the anode and cathode materials, a layer comprising one or more anhydrous alkali salts is coated onto the anode side or exterior of the cup 13. The cup 13 serves as support means for the alkali salt electrolyte. The electrolyte 16 may be applied by dipping or by vacuum deposition.

To the end that the alkali salt layer will be highly conductive to ions, i.e. its resistance is desired to be less than 100 ohms, its thickness is one millimeter or less, and it is heated by heat applied to the cell. However, the temperature of the alkali salt electrolyte 16 must not exceed a maximum which is sufficiently below its melting point that it maintains its structural integrity as a layer on the cup 13. In general, the temperature of the alkali salt electrolyte should be less than about 50% of its melting temperature.

The EMF cell embodying the invention is completed by a top cover plate 17 and electrodes 18 and 19. The cover plate 17 seals the chambers 14 and 15 and may be made of any suitable electrical insulating material. The electrodes 18 and 19 may be carbon or any metal which does not react with the anode, cathode, or electrolyte materials. The electrode 18 extends through the cover plate 17 into the anode material 11 while the electrode 19 extends through the cover plate 17 into the cup 13. It will be understood that, if desired, the electrode 19 may be positioned to extend through the cover plate 17 into the cathode material 12 without contacting the cup 13.

If the anode and cathode materials 11 and 12 do not completely fill the respective chambers 14 and 15, a nonoxidizing, inert gas may be used to fill the unoccupied space. Examples of some suitable gases include the so-called noble gases, nitrogen and helium.

Examples of anode, cathode, and electrolyte materials which can be used in cell constructed in accordance with the invention will now be given.

Example 1

The anode material 11 is sodium. Because the melting point of sodium is about 100° C., sulfur which has a melting point of about 119° C. may be advantageously used as the cathode material 12. To minimize vaporization of the sodium and the sulfur, the cell must operate at a relatively low temperature. The electrolyte should have a relatively low melting point. In this case, NaOH which has a melting point of 318.4° C. is used as the electrolyte 16 and is coated on the exterior surface of the cup 13 which is made of porous carbon. The cell is heated to maintain an operating temperature in the range of from about 100° C. to 250° C. with 150° C. preferred.

Example 2

The anode material 11 is sodium and the cathode material 12 is iodine. The electrolyte 16 is a eutectic mixture of 59 molar percent LiCl—41 molar percent KCl whose melting point is about 380° C. and the cup is porous carbon. The cell normally operates at a temperature of about 200° C. but will perform satisfactorily in a range of from 150° C. to 250° C.

Example 3

The anode materal 11 is sodium, the cathode material 12 is iodine, and the electrolyte 16 is NaCl. The cell normally operates at a temperature of about 300° C. but may be operated in a range of from 200° C. to 400° C.

Example 4

The anode material 11 is sodium and the cathode material 12 is iodine. The electrolyte 16 is a eutectic mixture of 10 molar percent NaCl—40 molar percent LiCl—50 molar percent KCl. The melting point of the electrolyte is about 400° C. and the cell is normally operated at a temperature of about 200° C. The operating temperature range of the cell may vary from about 150° C. to about 250° C.

The cell of Example 3 is the simplest form of a cell embodying the invention. That is, each of the anode and cathode materials is one of the constituents of the alkali salt electrolyte. With an alkali metal anode and an alkali salt electrolyte, the nonmetallic constitutent of the salt may be used as a cathode material in a cell built in accordance with the invention. However, as indicated previously, and as described in Example 1, other suitable oxidizing materials, such as sulfur, may be used as cathodes.

In general, the cell is operated at a temperature high enough to melt the alkali metal anode material but not high enough to melt the alkali salt electrolyte. With such a temperature, the cathode may be either a liquid or a gas depending on the materal used.

It will be seen from Examples 2 and 4 that the electrolyte may be comprised of a plurality of alkali salts. However, the objective of providing a low temperature cell should be kept in mind and the alkali salt or alkali salt mixture should be chosen accordingly.

It will be understood that changes and modifications may be made to the above-described EMF cell without departing from the spirit and scope of the invention as set forth in the claims appended hereto.

What is claimed is:
1. A heat-activated cell comprising:
a container;
divider means separating said container into first and second chambers, said divider means being a porous electrically conductive material;
an anode comprising at least one alkali metal disposed in said first chamber;
a cathode comprising at least one oxidizing material disposed in said second chamber;
an electrolyte comprising a layer of at least one alkali salt coated on one side of said divider means in said first chamber to separate said anode from said divider and from said cathode; and
means for heating said cell to a temperature sufficiently below the melting point of said alkali salt that said alkali salt becomes highly conductive to ions but does not disintegrate.

2. The cell claimed in claim 1 wherein said electrolyte is less than about one millimeter thick.

3. The cell claimed in claim 1 wherein the temperature of said electrolyte does not exceed 50% of its melting temperature.

4. The cell claimed in claim 1 wherein said divider means is carbon.

5. The cell claimed in claim 1 wherein said cathode material is a halogen.

6. The cell claimed in claim 1 and including a cover on said container and first and second electrodes extending through said cover into said anode and said divider, respectively.

7. The cell claimed in claim 6 wherein an inert gas occupies a space between said cover and said anode in said first chamber and an inert gas occupies a space between said cover and said cathode in said second chamber.

8. The cell claimed in claim 1 wherein said divider comprises a cup disposed in said container.

9. The cell claimed in claim 1 wherein said electrolyte is anhydrous NaOH and said temperature of said cell lies in a range from about 150° C. to about 250° C.

10. The cell claimed in claim 9 wherein said anode is sodium, said cathode is sulfur, and said temperature of said cell is maintained at about 200° C.

References Cited

UNITED STATES PATENTS

| | | | |
|---|---|---|---|
| 3,189,485 | 6/1965 | Panzer | 136—120 |
| 3,245,836 | 4/1966 | Agruss | 136—83 |
| 3,367,800 | 2/1968 | Panzer | 136—83 |
| 3,374,120 | 3/1968 | Lawson | 136—83 |
| 3,413,150 | 11/1968 | Kummer et al. | 136—6 |
| 3,437,524 | 4/1969 | Hamby | 136—83 |
| 3,445,288 | 5/1969 | Buzzelli | 136—6 |
| 3,455,742 | 7/1969 | Rao | 136—83 |
| 3,463,670 | 8/1969 | Rao et al. | 136—83 |

ALLEN B. CURTIS, Primary Examiner

C. F. LEFEVOUR, Assistant Examiner

U.S. Cl. X.R.

136—83